Jan. 10, 1967  A. J. DE MARIA  3,297,876
AMPLITUDE MODULATION FOR LASERS
Filed April 16, 1963  4 Sheets-Sheet 1
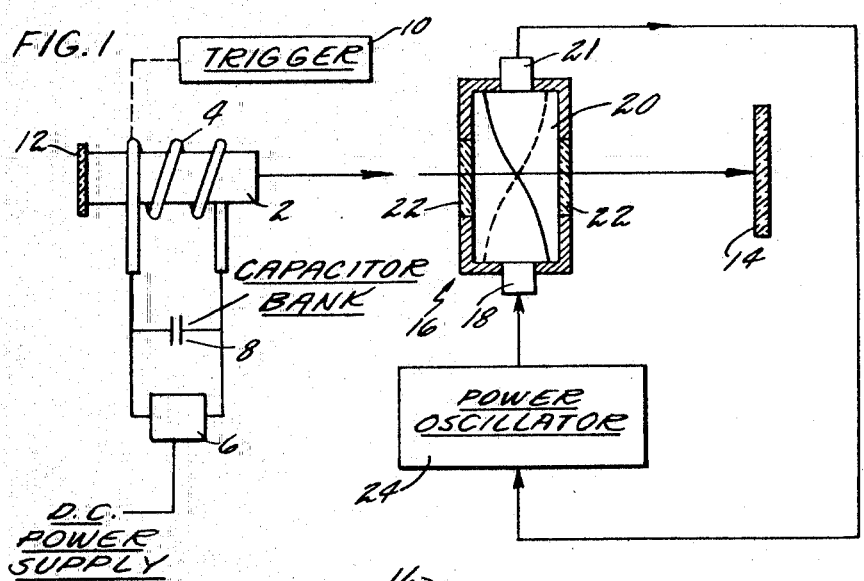
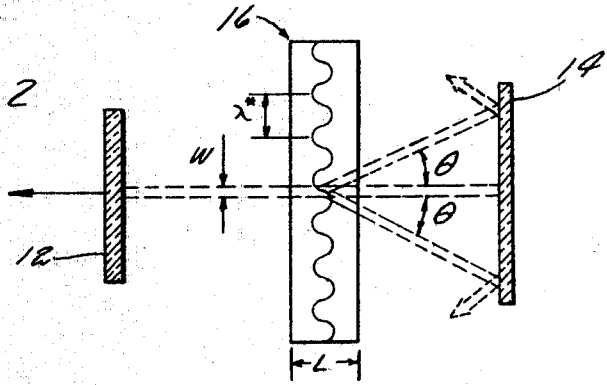
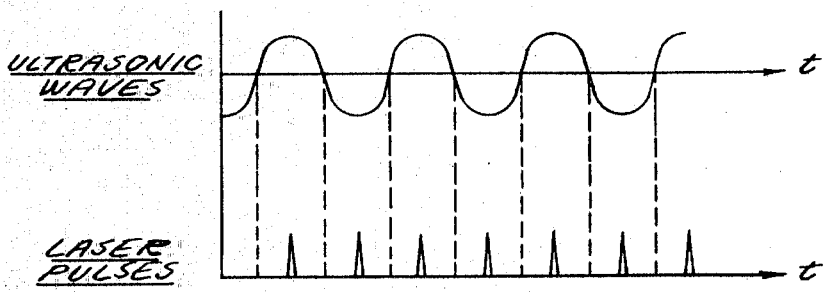
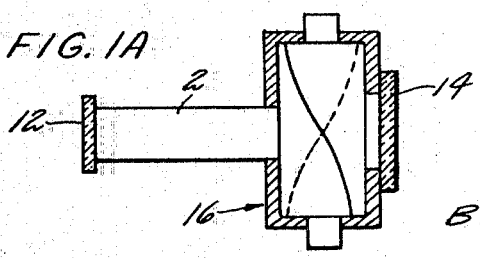
INVENTOR
ANTHONY J. DeMARIA
BY David S. Fishman
ATTORNEY

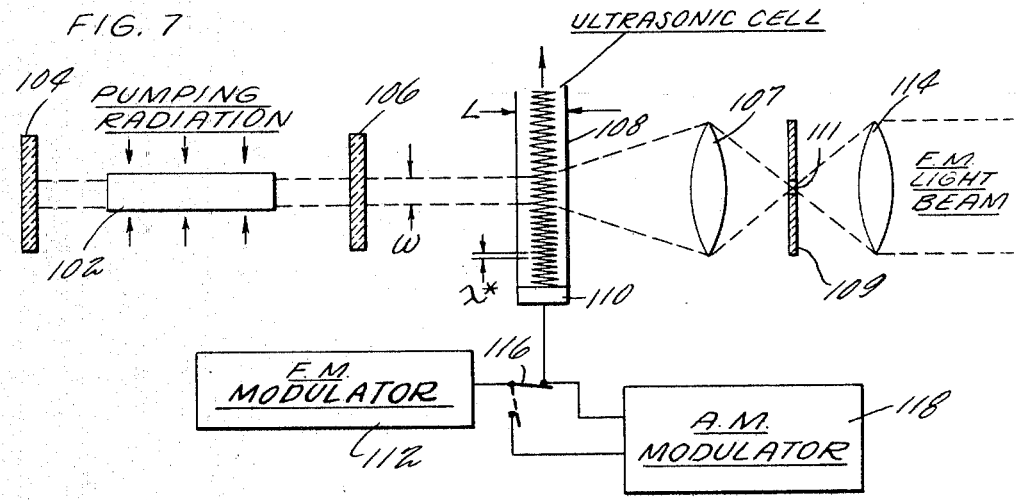
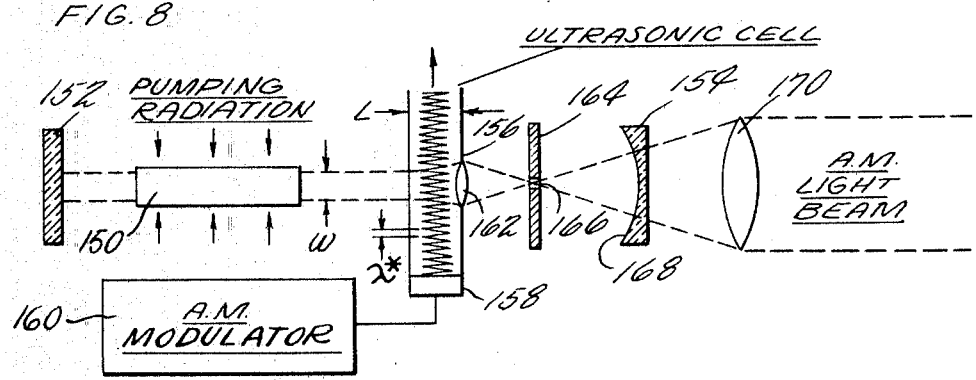
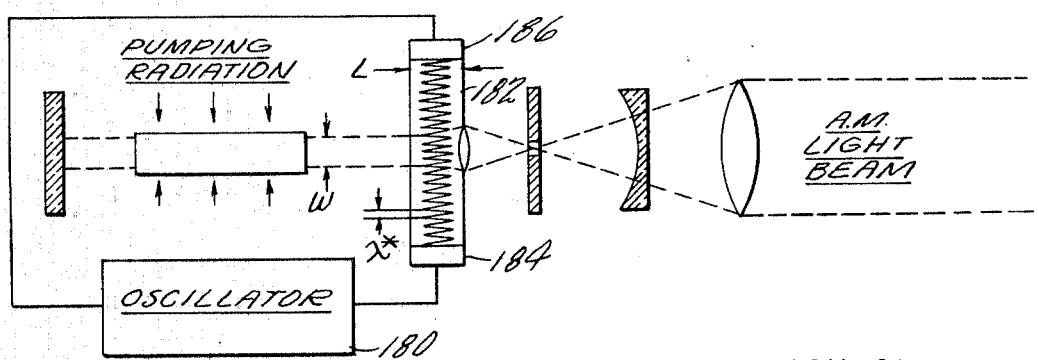

INVENTOR
ANTHONY J. DeMARIA
BY David S. Fishman
ATTORNEY 3,297,876
AMPLITUDE MODULATION FOR LASERS
Anthony J. De Maria, West Hartford, Conn., assignor to
United Aircraft Corporation, East Hartford, Conn., a
corporation of Delaware
Filed Apr. 16, 1963, Ser. No. 273,514
8 Claims. (Cl. 250—199)

This application is a continuation-in-part of application Serial No. 228,969, filed October 8, 1962.

This invention relates to infrared masers, optical masers, and ultraviolet masers, all of which will be referred to hereinafter as lasers. More particularly, this invention relates to the control of the output radiation from these laser devices.

This invention involves the control of laser action by obtaining a time varying refractive index in the Fabry-Perot optical cavity. One way of obtaining this time varying refractive index is by inserting an ultrasonic cell between the reflective end plates of the laser and propagating ultrasonic energy through the cell. Depending on the relation between the width of the electromagnetic radiation beam in the optical cavity of the laser and the wave length of the sound wave passing through the ultrasonic cell, either refraction or diffraction occurs, refraction occurring when the width of the electromagnetic radiation beam W is much narrower than the sound wave $\lambda^*$ and diffraction occurring when the width of the electromagnetic radiation beam W is much larger than the wave length of the ultrasonic wave. Through the teachings of the present invention and depending on the relationship between the width of the electromagnetic radiation beam in the optical cavity of the laser, the wave length of the sound wave in the ultrasonic cell, and the laser reflectors, the laser output can be controlled to eliminate the random output of some lasers, synchronize laser output with the ultrasonic frequency, amplitude modulate the output of some lasers, or a single, large power pulse can be obtained from the laser, or the laser output can be used for scanning purposes.

Accordingly, one feature of the present invention is a novel control system for lasers in which laser output is modulated and controlled ultrasonically.

Another feature of this invention is a novel control system for lasers in which laser output is controlled by the refraction or diffraction of electromagnetic radiation in the optical cavity of the laser through the use of a time varying refractive index in the feedback path of the laser.

Another feature of the present invention is a novel control for lasers in which laser output is synchronized with the frequency of an ultrasonic wave.

Still another feature of the present invention is a novel control for lasers in which laser output is shuttered either by ultrasonic diffraction interaction or ultrasonic refraction interaction to produce an extremely large amplitude output pulse from the laser.

Still another feature of the present invention is a novel laser control system in which an extremely large amplitude output pulse is achieved through the use of a reflecting surface positioned at an acute angle to the axis of the laser and with an ultrasonic cell for refracting the electromagnetic radiation in the optical cavity of the laser.

Still another feature of the present invention is a novel control system for lasers in which ultrasonic cells are used to deflect the laser output to produce a scanning system.

Still another feature of the present invention is a novel laser system in which laser output is ultrasonically gated to align, control or measure the parallelism of two flat plates.

Still another feature of the present invention is a novel laser control system in which the output of a continuous wave laser can be gated or amplitude modulated by an ultrasonic wave whereby pulse repetition rate is determined by optical pumping intensity and ultrasonic frequency.

Still another feature of the present invention is a novel system for frequency modulating laser output.

Still another feature of the present invention is a novel system for amplitude modulating laser output.

Other features and advantages will be apparent from the specification and claims, and from the accompanying drawings which illustrate an embodiment of the invention.

FIGURE 1 is a showing of the control system of the present invention in which an ultrasonic cell is interposed between the laser and a reflecting surface to generate a gated output from the laser.

FIGURE 1a is a showing of alternative structure of FIG. 1 wherein the laser, the ultrasonic cell, and the outboard mirror are abutted.

FIGURE 2 is a showing of a part of FIG. 1 in which the ultrasonic refraction of the electromagnetic radiation beam in the optical cavity of the laser is illustrated.

FIGURE 3 is a showing of the coordination and synchronization between the ultrasonic wave and the laser pulses of the structure of FIG. 1.

FIGURE 7 is a showing of an ultrasonic control system for lasers in which laser output can be either frequency modulated or amplitude modulated or both frequency and amplitude modulated.

FIGURE 8 is a showing of an ultrasonic control system for lasers in which laser output can be amplitude modulated.

FIGURE 8a is a modification of the structure of FIG. 8 for amplitude modulation at a fixed frequency.

Figure 4:
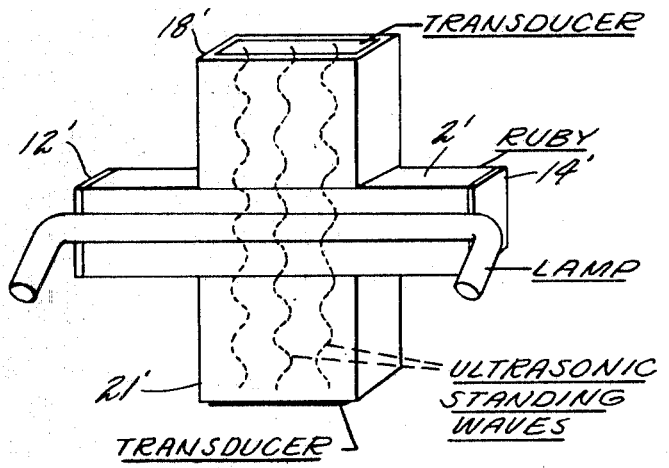
FIGURE 4 is a variation of the structure of FIG. 1 wherein the ultrasonic energy is passed directly through the active laser element.

Except where otherwise indicated, the following discussion will describe the present invention as used with a ruby laser and a liquid medium ultrasonic cell. However, it is to be expressly understood that any type of laser and any ultrasonic cell either liquid, gas, or solid can be used in the practice of the present invention, or the ultrasonic wave can be propagated through the active portion of the laser system.

Referring now to FIG. 1, a ruby laser 2 is shown with a pumping lamp 4 which has a D.C. power supply 6 and a capacitor bank 8 connected thereto, and a triggering circuit 10 is provided for lamp 4. The lamp 4 and its lighting circuitry are conventional laser pumping apparatus and form no part of the present invention. Laser 2 is a standard ruby laser except that only one end has the usual reflective coating or mirror 12 while the other end is uncoated and the mirror usually present at the now uncoated end is moved outboard as at 14 parallel to mirror 12 and in alignment with the axis of the laser and facing the uncoated end, mirror 14 preferably being more reflective than mirror 12. An ultrasonic cell 16 is interposed between the uncoated end of the laser and mirror 14 so that cell 16 is in the optical cavity of the laser. Cell 16 has a BaTiO$_3$ transducer 18, an alcohol medium 20 and a BaTiO$_3$ receiver 21, and cell 16 has transparent windows 22 to allow passage of the laser output. Transducer 18 is driven by oscillator 24 to generate an ultrasonic frequency wave in medium 20, and the output from receiver 21 is fed back to oscillator 24 to supply positive feedback for the oscillator. Cell 16 is excited concomitantly with the pumping of ruby 2. Cell 16 could be a traveling wave cell as well as the standing wave cell described.

In the configuration of FIG. 1 the elements are selected so that the width W of the electromagnetic radiation beam in the optical cavity of laser 2 is much narrower than the wave length $\lambda^*$ of the sound wave in the ultrasonic cell, the ratio $W\lambda/^*$ being approximately ¼ or less. With W much less than $\lambda^*$ the electromagnetic radiation beam in the optical cavity of laser 2 passing through the ultrasonic field in cell 16 will be refracted back and forth in a sinusoidal manner with the deflection $\theta$ being given by the expression $$\sin \theta = \frac{2\pi\Delta\mu L}{\lambda^*} \cos 2\pi f^* t \quad (1)$$

where $\Delta\mu$ is the maximum change of the refractive index of the cell medium caused by the ultrasound, L is the path length of the light through the sound field, $f^*$ is the ultrasonic frequency, and $t$ is time. Referring to FIG. 2, which is a simplified schematic of FIG. 1 and in which like elements are numbered as in FIG. 1, the refraction of the electromagnetic radiation beam is illustrated. Thus, when laser 2 is pumped, an emitted beam is passed through the ultrasonic field and is caused to scan mirror 14. When the angle $\theta$ is large the beam reflected from mirror 14 is directed away from laser 2 and the energy loss will prevent laser action from taking place at these angles. However, when $\theta$ is zero or nearly zero the energy incident on mirror 14 is reflected or fed back to laser 2 and laser action will occur. The angle $\theta$ will be zero twice in each cycle of the sound wave, and hence laser action will take place with a pulse repetition frequency of $2f^*$, and this relationship is shown in FIG. 3. In addition, as shown in FIG. 1a, the elements of the system can be brought together to reduce losses. Thus, cell 16 is butted against the uncoated end of ruby 2 and mirror 14 is butted against cell 16. In this configuration it would be desirable to choose the cell medium such that it matches the index of refraction of the active laser material. Only a few watts of ultrasonic power are needed for this ultrasonic feedback modulation technique. For example, a 5 cm. long, 0.6 cm. diameter ruby was operated as in FIG. 1 with a pumping energy of 3360 joules. The ultrasonic cell was excited at 122 kc. with less than 10 watts applied to transducer 18, and a series of evenly spaced laser outputs at $2f^*$ was obtained.

Thus, it can be seen that laser action can be coordinated and synchronized with ultrasonic frequency to produce an ultrasonic feedback modulation of electromagnetic radiation in the optical cavity of a laser whereby evenly spaced laser pulses are realized rather than the usual random output pulses of some laser, or a continuous wave output can be gated or amplitude modulated. In addition, an increase in pulse height, a decrease in pulse width, and a sharpening of pulse rise time are realized through this ultrasonic feedback modulation technique, and there are no moving parts in the system.

It has been stated above that laser action with the ultrasonic feedback modulation of FIG. 1 will occur at the rate of $2f^*$; however, this has presupposed that the ultrasonic frequency is low enough to allow sufficient time for the E energy level population to reach the threshold value every half cycle of the ultrasonic sound wave. If the pumping intensity is not sufficient for the E population level to reach threshold every half cycle of the ultrasonic sound wave, laser action will occur once every full cycle of the sound wave. Thus, it will be understood that the frequency of laser action can be made to vary from $2f^*$, to $1/nf^*$, wherein $=1, 2, 3 \ldots$, by regulating the intensity of the pumping of the laser.

The generation of a series of sharp, evenly spaced laser pulses through ultrasonic feedback modulation of laser output described above can find application in a variety of purposes, including, but not limited to, radar, range determination, and communcation.

The above-described ultrasonic gating of the output of ruby 2 can also be achieved with mirror 14 deviated from parallelism with mirror 12, i.e., at an acute angle to the axis of ruby 2. Positioning mirror 14 in this manner forces the gating action of ruby 2 to occur at the ultrasonic frequency $f^*$ over a large range of optical pumping intensities and firmly establishes a fixed phase relationship between the ultrasonic frequency and the laser oscillations. Measurements have shown that a 6 minute off parallelism between mirrors 12 and 14 results in a 90° displacement of the laser spikes with respect to the ultrasonic wave form.

Referring now to FIG. 4, wherein parts similar to FIG. 1 are numbered as in FIG. 1 with a prime (') superscript, a configuration is shown wherein both ends 12' and 14' of the ruby 2' are reflective coated. Ultrasonic waves are generated by transducer 18' and passed through the ruby 2' to receiver 21'. Pumping light is supplied by lamp 4'. The configuration shown in FIG. 4 produces an output of evenly spaced laser pulses in the same manner as the structure of FIG. 1. In the structure of FIG. 4 the refraction of the electromagnetic radiation beam occurs internally of the ruby 2', and the electromagnetic radiation beam scans mirror 14' and is periodically reflected to produce laser action as described above. Of course, a traveling wave could also be passed through ruby 2'.

Figure 5:
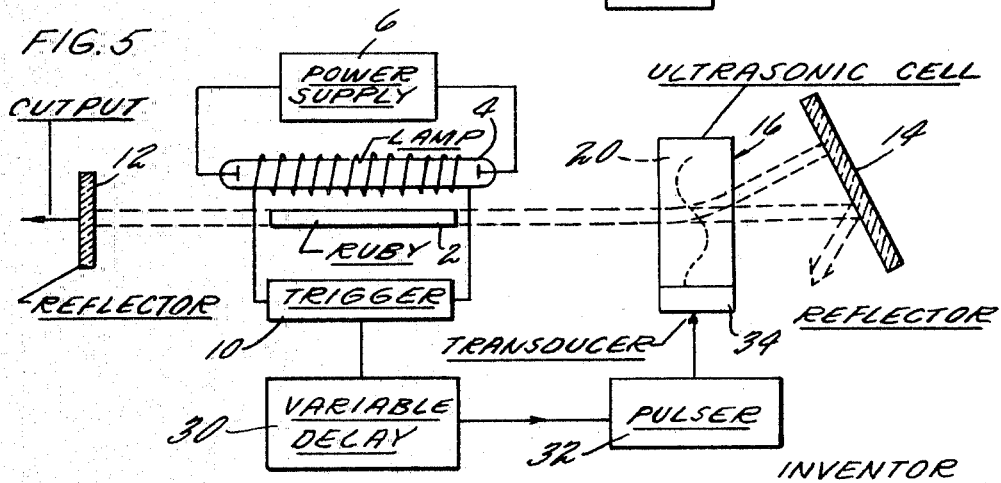
FIGURE 5 is a showing of an ultrasonic control system for lasers in which one or more large output pulses are generated.

Referring now to FIG. 5, a configuration is shown whereby an ultrasonically gated giant pulse is obtained from a ruby laser. The structure is quite similar to that of FIG. 1, and like elements are numbered as in FIG. 1. The output from the trigger 10 is passed through a variable delay 30 and thence to a pulse generator 32, the output from pulse generator 32 trailing the initiation of pumping light by a predetermined time. Pulser 32 rings a transducer 34 in ultrasonic cell 16 which drives alcohol medium 20. Mirror 12 is shown removed from the end of ruby 2, but could just as well be as in FIG. 1. The significant differences in the FIG. 5 configuration from that of FIG. 1 is that mirror 14 is deviated from parallelism with mirror 12, i.e., mirror 14 forms an acute angle with the axis of ruby 2 and there is a deliberate delay between initiation of pumping of ruby 2 and excitation of cell 16.

In the operation of the structure of FIG. 5, the pumping of ruby 2 is initiated prior to the excitation of ultrasonic cell 16 due to delay 30. The deviation from parallelism of mirror 14 is such that for a given amount of pumping enough of the spontaneous fluorescence from ruby 2 is deflected away from the ruby rather than returned to it so that lasing of the ruby is prevented. In essence, the optical feedback path to the ruby has been blocked, i.e., a high value for the threshold energy of the laser is created, the device will not oscillate, and a large overpopulation of excited atoms results. Variable delay 30 is set to actuate pulser 32 and pulse transducer 34 with a high voltage pulse to pass an ultrasonic wave through alcohol medium 20, preferably when overpopulation is at a maximum. The spontaneous radiation from ruby 2 passing through cell 16 to mirror 14 interacts with the ultrasonic wave and is refracted in accordance with Equation 1, supra, the wave length of the ultrasonic wave in cell 16 being much greater than the width of the laser beam, and a condition will occur when the radiation will be directed perpendicular to mirror 14. At this time, a high restoration of positive feedback to ruby 2 is initiated and laser action will occur with a very large burst of radiation.

Experiments with the configuration of FIG. 5 using a 5 cm. long, 0.6 cm. diameter ruby, energizing at 900 joules and with a 4 μsec. pulse used to ring a 182 kc. lead zirconate titanate transducer have produced pulse heights of 50 to 75 times the normal pulse amplitudes with a rise time of less than 30 nanoseconds and with pulse widths on the order of 50 to 75 nanoseconds, in contrast with microsecond pulse widths of the random pulses.

This large output spike can find application in long range radar, range finding, and for large welding and drilling operations.

The structure of FIG. 5 can be used to obtain a series of relatively large pulses by periodically exciting the ultrasonic cell during normal lasing action.

Reverting now to the structure of FIG. 1, the giant pulse described above in connection with the operation of FIG. 5 can be realized with the FIG. 1 configuration if $\lambda^*$ is selected to be much less than $W$, the ratio $W/\lambda^*$ being 7/1 or more. Under these conditions the beam passing through the excited ultrasonic cell is diffracted rather than refracted, and it can be shown that with sufficient ultrasonic intensity the diffraction pattern has low intensity in the center order. This effect results in higher intensity of the higher diffractory orders whose direction of propagation deviates from the axis of the ruby rod, thereby yielding a high loss to the system which is sufficient to prevent laser action. Also, diffraction of the beam destroys the coherent nature of the radiation reflected back and forth between mirrors 12 and 14 and laser action is prevented: thus, overpopulation of excited atoms occurs. Then the ultrasonic oscillations are stopped and spontaneous radiation is reflected back to ruby 2 from mirror 14 and laser action takes places with a giant output spike.

Figure 6:
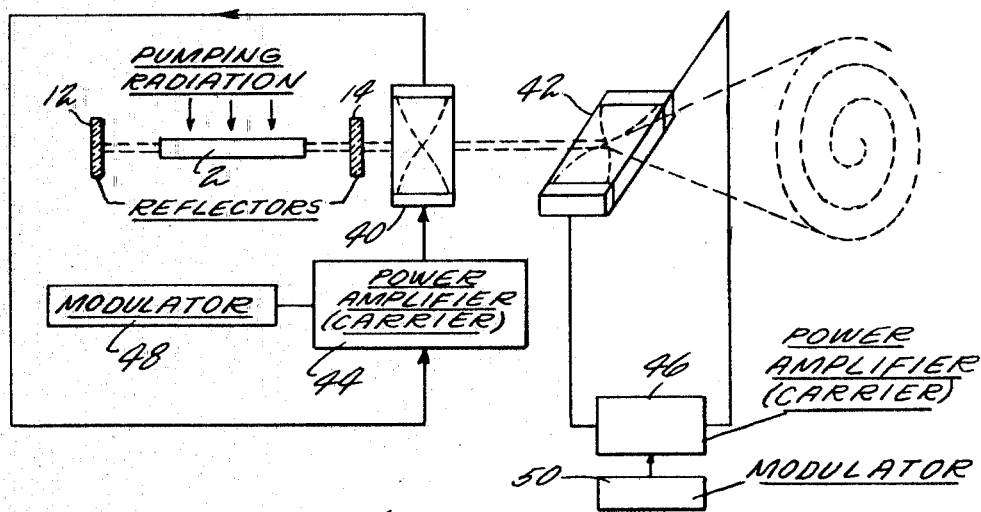
FIGURE 6 is a showing of an ultrasonic control system for lasers in which the laser beam can be scanned in a variety of patterns.

Referring now to FIG. 6, a configuration is shown whereby the laser beam can be deflected horizontally and vertically to produce a scanning system for drilling, welding, scanning a target, etc. The structure is similar to that in FIG. 1, except that two ultrasonic cells 40 and 42 are placed downstream of mirror 14 and at right angles to each other. Cells 40 and 42 are driven by amplifiers 44 and 46, respectively, and modulators 48 and 50, which may be either frequency or amplitude modulators as desired, are connected to amplifiers 44 and 46, respectively. This system is operated in the regime where $W/\lambda^* \lesssim 1/4$, and thus the laser beam passing through ultrasonic cells 40 and 42 is deflected. Simultaneous horizontal and vertical deflection can be obtained by energizing the cells 40 and 42 with different frequencies, or spiral scanning can be obtained by driving the cells at identical frequencies and different power levels. Thus, it should be apparent that a variety of scanning patterns can be obtained by manipulating power, frequency, and phase of the driving signals to the ultrasonic cells.

Larger angles of deflection can be obtained by pressurizing the medium of the cells 40 and 42 to allow the use of high intensity ultrasonic waves without encountering cavitation.

Reverting again to the structure of FIG. 1, a measurement of the parallelism of two plates can be obtained. Experiments have shown that a 4 second deviation from parallelism between mirrors 12 and 14 results in a 1° displacement of the gated laser pulse with respect to the ultrasonic wave form. Thus, by monitoring the position of the gated laser pulses with a photo detector and simultaneously displaying the gated laser pulses and ultrasonic wave forms on a scope, the parallelism between reflective plates can be determined by observing the relative positions of the gated pulses and the ultrasonic wave forms. Of course, it will be understood that the plates whose parallelism is being measured need not be the usual reflective surfaces of the laser but could be plates displaced from the ends of the ruby and used as the reflecting surfaces.

Referring now to FIG. 7, there is shown a continuous wave active laser element 102 and parallel reflecting end plates 104 and 106, plate 104 being more reflective than plate 106. Pumping radiation as indicated by the labeled arrows is delivered to laser element 102 by any convenient method, and reflecting end plates or surfaces 104 and 106 could abut or form the ends of active element 102 rather than being separate as shown. An ultrasonic cell 108 having a transducer 110 is positioned to the right of reflective end plate 106 in the path of the emitted beam from laser 102. It will be observed that in the configuration of FIG. 7 ultrasonic cell 108 is located outside of the optical cavity of the laser system defined by reflective end plates 104 and 106. An FM modulator 112 is connected to drive transducer 110 to generate traveling waves of varying frequency in ultrasonic cell 108. A lens 107 receives the laser output from cell 108 and displays it on an opaque surface 109 having an aperture 111 therein, surface 109 being at the focal point of lens 107. A standard type of collimating optics 114 is located to the right of plate 109 and is focused on aperture 111 for transmitting light signals passing through aperture 111.

The system shown in FIG. 7 is operated in the regime where the width $W$ of the emitted beam from laser 102 is much wider than the wave length $\lambda^*$ of the sound wave in the ultrasonic cell, the ratio $W:\lambda^*$ being approximately 7:1 or greater. Under this condition where $W$ is much greater than $\lambda^*$, the beam of emitted light from laser 102 is diffracted in passing through the ultrasonic field in cell 108 due to a time varying refractive index caused by the ultrasonic field, the diffraction pattern being in the form of a series of illuminated areas of varying intensity as indicated graphically in FIG. 9 normally diminishing in intensity from the zero order to higher orders.

Figure 9:
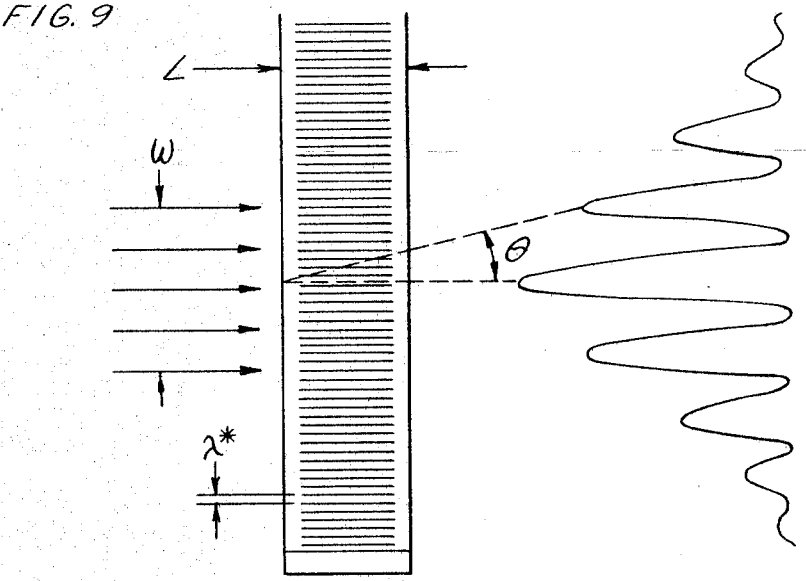
FIGURE 9 is a showing of an ultrasonic diffraction pattern created by the systems shown in FIGS. 7 and 8.

Referring now to FIG. 9, the beam of emitted laser light is diffracted in passing through the ultrasonic field in cell 108, the diffraction being at angle $\theta$ given by $$\sin \theta = \frac{\pm K\lambda}{\lambda^*} \tag{2}$$

where $K$ equals 0, 1, 2, 3, 4, etc. (diffraction orders), $\lambda$ equals the wave length of the emitter laser beam, and $\lambda^*$ equals the wave length of the sound wave in the ultrasonic cell. For the case of traveling sound waves depicted in FIGS. 7 and 9, the sound wave in the ultrasonic cell acts as a diffraction grating which is moving with the velocity of sound at right angles to the direction of the emitted laser light incident on the ultrasonic cell. As a result of the Doppler effect, the light beam which is bent aside in the diffraction spectra in the direction of propagation of the sound wave experiences an increase in frequency while the light beam diffracted in the opposite direction is lowered in frequency. The frequency $\nu_K$ of the light deflected through an angle $\theta_K$ from its original direction may be calculated from the relation $$\nu_K = \nu_0 \left(1 \pm \frac{2nV}{c} \sin \frac{\theta}{2}\right) \tag{3}$$

where $\nu_0$ equals the frequency of the laser light incident on the ultrasonic cell 108, $n$ equals the index of refraction of the medium of cell 108, $c$ equals the velocity of light in free space, and $V$ equals the velocity of sound in the medium of cell 108. From Equation 2 and from the fact that $n=c/c_n$ where $c_n$ is the velocity of light in the medium of cell 108, the following relationship results $$\nu_K = \nu_0 \pm K f^* \tag{4}$$

where $f^*$ equals the frequency of the ultrasonic wave in cell 108.

As can be seen from Equation 4, the emitted laser beam, in passing through ultrasonically excited cell 108, will be diffracted into a pattern of lights of different frequency, and the difference in frequencies between the orders of the diffraction pattern will be a direct function of the frequency of the ultrasonic wave in cell 108.

FM modulator 112 delivers an FM signal to transducer 110 in accordance with a message or intelligence that it is desired to transmit, such as a voice message. The frequency modulated signal delivered to transducer 110 generates a frequency modulated traveling wave in ultrasonic cell 108 in accordance with the intelligence to be transmitted, and, in accordance with Equations 2 through 4, the frequency modulation of the ultrasonic wave in cell 108 is superimposed on the diffraction pattern produced by excited cell 108 so that the frequencies of the orders of the diffraction pattern other than the zero order are varied in accordance with the changes in frequency of the ultrasonic wave in cell 108 and hence in accordance with the intelligence that it is desired to transmit.

In the case of a frequency modulated traveling wave in ultrasonic cell 108, the frequency of the zero order of the diffraction pattern remains constant at the frequency of the emitted laser beam, and the frequencies of all other orders in the diffraction pattern change in proportion to and as a function of the change in frequency of the ultrasonic wave in cell 108. Opaque surface 109 is positioned so that aperture 111 only passes selected orders of the diffraction pattern, e.g., the zero and first orders, which are then recollimated by optics 114 for long distance propagation. An optical photoelectric or photoconductor type of superheterodyne receiver known in the art, can be placed to receive the FM light beam from collimating optics 114 and can be tuned to detect the changes in frequencies between the orders of the diffraction pattern passed by aperture 111 and generate electrical signals to reproduce the transmitted information. As an alternative, aperture 111 could be placed to pass only one order of the diffraction pattern, e.g. the first order, and this one order could be beat against the output of a local oscillator. Also, for the transmission of an FM beam, lens 107 and surface 109 could be omitted so that collimating optics 114 would deliver an FM light beam of a mixture of all frequencies in the diffraction pattern to a receiver properly tuned to a band of frequencies.

If each order of the diffraction pattern created by cell 108 is of sufficient intensity to be itself diffracted into a definite pattern, then each order of the diffraction pattern could be passed through a separate ultrasonic cell for frequency modulation. This diffraction of each order of the diffraction pattern could be repeated as many times as a useful diffraction pattern could be obtained by diffracting each order of a diffraction pattern, i.e., as long as the intensity of each order of a diffraction pattern was sufficiently high to be diffracted into a useful pattern. A number of different messages may be imposed on the single light beam emitted from laser 102 through this technique of repeated diffraction, and all of the final diffraction patterns can be recollimated by optics 114 for transmisison of the several messages in a single beam of light.

Referring to FIG. 8, a system is shown whereby a pulsed output type laser or a continuous wave laser can be modulated by ultrasonic diffraction to obtain a series of evenly spaced output pulses of equal magnitude, or whereby a continuous wave laser can be amplitude modulated by ultrasonic diffraction to produce an amplitude modulated output commensurate with intelligence or a message.

A laser system consisting of active laser element 150 and reflecting end plates 152 and 154 has an ultrasonic cell 156 and transducer 158 in the optical cavity, plate 152 being more reflective than plate 154. A lens 162 either in or to the right of cell 156 displays the output from cell 156 on an opaque plate 164 having an aperture 166 therein, plate 164 being at the focal point of lens 162. The inner surface 168 of reflector 154 is curved along a radius such that its focal point is at plate 164 so that light incident on surface 168 from aperture 166 will be reflected back through aperture 166 to lens 162 and thence to laser element 150. Transducer 158 is driven by AM transmitter 160, and, as in the system of FIG. 7, the system of FIG. 8 is operated in the region where $W/\lambda^*$ is approximately 7/1 or greater so that the electromagnetic energy in the optical cavity of the laser system is diffracted. Plate 164 is placed so that only the zero order of the diffraction pattern passes through aperture 166 and impinges on curved reflecting surface 168.

Figure 10:
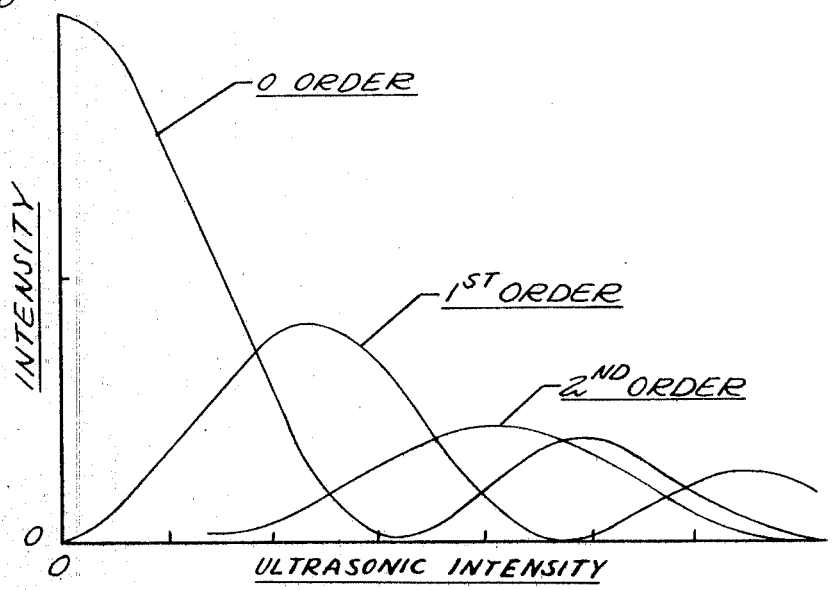
FIGURE 10 is a showing of variations in diffraction pattern intensity with variations in ultrasonic intensity.

Referring now to FIG. 10, there is shown in graphic form the relationship between the intensity of the orders of the diffraction pattern and the intensity of the ultrasonic wave in cell 156. As can be seen, the intensity of the zero order falls off to almost zero and then rises slightly as ultrasonic intensity increases while the intensities of the higher orders of the diffraction pattern increase and decrease as a function of ultrasonic intensity. Also, it can be seen that the zero order curve is linear along a great portion of its slope.

The relative intensity of the $m$th order of the diffraction pattern to the $n$th order of the diffraction patern is given by the expression $$\frac{I_m}{I_n} = \frac{J_m^2\left(\frac{2\pi\Delta\mu L}{\lambda}\right)}{J_n^2\left(\frac{2\pi\Delta\mu L}{\lambda}\right)} \quad (5)$$

where $J_m$ and $J_n$ are the Bessel functions of the $m$th order and the $n$th order of the diffraction pattern, $\Delta\mu$ is the maximum variation of the refractive index in the ultrasonic cell, and L is the length travelled by the electromagnetic energy in the ultrasonic medium and $\lambda$ is the light wave length. The angle that the respective orders of the diffraction pattern make with the initial direction of propagation is given by Equation 2.

Figure 10A:
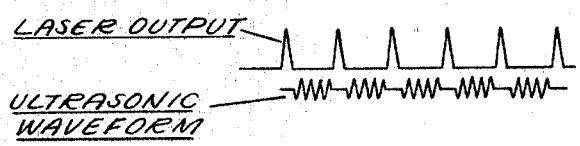
FIGURE 10a is a showing of synchronism between laser output and ultrasonic wave form for one mode of operation of the system of FIG. 8.

If ultrasonic cell 156 is excited by an unmodulated output from AM transmitter 160 driving transducer 158 so that an unmodulated uniform traveling wave is set up in cell 156 at an intensity sufficient to suppress the zero order of the diffraction pattern, a high loss will result to the laser system because the zero order of the diffraction pattern will not be fed back to laser element 150. Since aperture 166 is positioned so that only the zero order can pass through the aperture and impinge on surface 168, and since the zero order will be suppressed at this time, lasing action will not occur. Interrupting the ultrasonic wave in cell 156 by interrupting the output from transmitter 160 will remove the diffraction pattern, and the electromagnetic energy of the laser system will be fed back by reflectors 152 and 154 in usual fashion so that lasing action will occur. Similarly, lasing action can also be made to occur by reducing the intensity of the ultrasonic wave to the level wherein the intensity of the zero order of the diffraction pattern is strong, and this strong zero order will be fed back to laser 150 by reflectors 152 and 154 to cause lasing action. Re-establishing the original uniform traveling wave in cell 156 would again establish a diffraction pattern with a suppressed zero order, and lasing action would be interrupted. Thus, as seen in FIG. 10a, the output of the laser system can be coordinated or synchronized with the ultrasonic excitation of cell 156 so that a series of spaced pulses can be obtained from the laser system through ultrasonic diffraction of the electromagnetic energy of the laser in the feedback path. These output pulses can be either evenly spaced or unevenly spaced depending on the spacing of the outputs from transmitter 160.

When the output of transmitter 160 is amplitude modulated in accordance with a message or intelligence, the intensity of the ultrasonic wave in cell 156 will be similarly modulated. As a result, the intensity of the orders of the diffraction pattern produced from the interaction of the ultrasonic wave and the electromagnetic radiation from laser element 150 will be varied, and the zero order intensity can be varied almost linearly over a very wide range of intensities. With aperture 166 positioned as described, only the variation in intensity of the zero order of the diffraction pattern is of interest since only the zero order will affect the amount of feedback to laser 150 to modulate laser output. When laser 150 is of the continuous wave type, the output of the laser system will be amplitude modulated in accordance with the message or intelligence represented by the amplitude modulated output of transmitter 160.

Whether the output from the laser 150 is amplitude modulated for the transmission of a message or intelligence or is modulated as shown in FIG. 10a for the generation of a series of pulses, the output can be recollimated for long distance transmission by optics 170 focused on aperture 166. If mirror 154 were more reflective than mirror 152 no collimating optics would be necessary because laser output would be a collimated beam through mirror 152. The repetitive pulse output can find ready application in systems such as radar and range finding, and the amplitude modulated message output can be detected by well-known photoelectric devices.

Referring now to FIG. 8a, a system similar to that in FIG. 8 is shown in which the traveling wave transmitter 160 and cell 156 of FIG. 8 are replaced by a standing wave oscillator 180 and ultrasonic cell 182 having transducers 184 and 186 connected to the output and return, respectively, of oscillator 180. The remaining structure of FIG. 8a is as in FIG. 8, and the operation of the structure of FIG. 8a differs from the FIG. 8 structure in that a standing ultrasonic wave of a frequency $fo$ is set up in cell 182 for a given output from oscillator 180. The maximum intensity of the wave in cell 182 will be selected to be at a level sufficient to suppress the zero order of the diffraction pattern, and the structure of FIG. 8a will automatically operate to gate laser output at a frequency of $2f^*$.

The AM modulated systems of FIGS. 8 and 8a could also be operated without lens 162 and plate 164; but, the higher orders of the diffraction pattern would be fed back to laser 150 when the zero order was suppressed, and control of laser output would not be as refined.

Referring once again to the structure of FIG. 7, the frequency modulated output of the structure of FIG. 7 can also be amplitude modulated for the transmission of additional messages or intelligence. Thus, switch 116 can be closed to deliver the output from FM transmitter 112 to AM modulator 118 where it is amplitude modulated prior to being delivered to drive transducer 110. Thus, an amplitude modulated signal can be imposed on the frequency modulated cell 108 to modulate the intensity of the orders of the diffraction pattern established by cell 108. In this manner, both frequency modulated and amplitude modulated signals can be transmitted by the structure of FIG. 7.

It is to be understood that the invention is not limited to the specific embodiment herein illustrated and described, but may be used in other ways without departure from its spirit as defined by the following claims.

I claim:
1. In a control system for lasers, means for generating a laser output including an active continuous wave laser element having end reflectors, at least one of said reflectors being spaced at a distance from said laser element, the space between said reflectors defining an optical cavity, a liquid ultrasonic cell positioned in said optical cavity between said laser element and said spaced reflector whereby the laser output passes through said cell, means for generating an amplitude modulated signal, and means for applying said signal to said cell to generate an amplitude modulated wave within said cell, said laser output being intensity modulated in accordance with said signal as said laser output passes through said cell.

2. A control system for lasers as in claim 1 in which said amplitude modulated wave within said cell is a travelling wave.

3. A control system for lasers as in claim 2 in which the amplitude modulated travelling wave has a wavelength $\lambda^*$ which is related to the width of the laser output W by the relationship $W/\lambda^* \leq 7$ whereby said laser output is diffracted when passing through said cell.

4. Apparatus as in claim 3 and including means for passing only the zero order of said diffracted laser output.

5. Apparatus as in claim 4 wherein said means for passing only the zero order of said diffracted output includes a lens positioned to receive the laser output between said cell and said spaced reflector, and an opaque plate having an aperture therein positioned at the focal point of said lens.

6. Apparatus as in claim 5 in which said spaced reflector is curved and has its focal point at the aperture of said opaque plate.

7. Apparatus as in claim 4 and including means for periodically reducing the intensity of said amplitude modulated signal applied to said cell to thereby produce a pulsed laser output.

8. Apparatus as in claim 1 in which said amplitude modulated wave is a constant amplitude standing wave whereby a laser output of twice the frequency of the amplitude modulated wave is produced.

References Cited by the Examiner

UNITED STATES PATENTS

| | | |
|---|---|---|
| 2,515,054 | 7/1950 | Pagliarulo. |
| 2,929,922 | 3/1960 | Schawlow et al. _____ 250—199 |
| 3,126,485 | 3/1964 | Ashkin et al. _____ 250—199 |
| 3,171,031 | 2/1965 | Yariv _____ 250—199 |

FOREIGN PATENTS

| | | |
|---|---|---|
| 608,711 | 3/1962 | Belgium. |
| 776,129 | 6/1957 | Great Britain. |

OTHER REFERENCES

Hellwarth: Advances in Quantum Electronics, 1961, p. 340.

Vogel et al.: Electronics, vol. 34, Nov. 10, 1961, pp. 81–85.

De Maria et al.: Proc. I.R.E., June 1962, p. 1522.

DAVID G. REDINBAUGH, *Primary Examiner.*

JOHN W. CALDWELL, *Examiner.*